United States Patent

Hughes et al.

[11] Patent Number: 5,966,224
[45] Date of Patent: Oct. 12, 1999

[54] SECURE COMMUNICATIONS WITH LOW-ORBIT SPACECRAFT USING QUANTUM CRYPTOGRAPHY

[75] Inventors: Richard J. Hughes; William T. Buttler; Paul G. Kwiat; Gabriel G. Luther, all of Los Alamos; George L Morgan, Jemez Springs; Jane E. Nordholt, Los Alamos; Charles G. Peterson, Los Alamos; Charles M. Simmons, Los Alamos, all of N.Mex.

[73] Assignee: The Regents of the University of California, Los Alamos, N.Mex.

[21] Appl. No.: 08/859,187

[22] Filed: May 20, 1997

[51] Int. Cl.$^6$ .............................. H04B 10/22; H04L 9/00
[52] U.S. Cl. .............................. 359/112; 380/21; 380/44; 380/46
[58] Field of Search ........................ 359/112, 172, 359/181; 380/21, 43, 44, 46, 54

[56] References Cited

U.S. PATENT DOCUMENTS

| | | | |
|---|---|---|---|
| 5,307,410 | 4/1994 | Bennett | 380/21 |
| 5,515,438 | 5/1996 | Bennett et al. | 380/21 |
| 5,568,301 | 10/1996 | Tiemann et al. | 359/140 |
| 5,850,441 | 12/1998 | Townsend et al. | 380/21 |

OTHER PUBLICATIONS

Richard J. Hughes et al., "Improved Detector For Quantum Cryptography," U.S. Patent Application Serial No. 08/647,479, filed May 14, 1996, now abandoned.

P. D. Townsend et al., "Single Photon Interference in 10 km Long Optical Fibre Interferometer," Electronics Letters, vol. 29, No. 14, Jul. 1993.

P. D. Townsend et al., "Enhanced Single Photon Fringe Visibility in A 10 km Long Prototype Quantum Cryptography Channel," Electronics Letters, vol. 29, No. 14, pp. 1291–1293, Jul. 1993.

P. D. Townsend, "Secure Key Distribution System Based On Quantum Cryptography," Electronics Letters, vol. 30, No. 10, pp. 809–811, May, 1994.

Simon J. D. Phoenix et al., "Multi–User Quantum Cryptography on Optical Networks," Journal of Modern Optics, vol. 42, No. 6 pp. 1155–1163, Jun. 1995.

*Primary Examiner*—Leslie Pascal
*Attorney, Agent, or Firm*—Milton D. Wyrick

[57] ABSTRACT

Apparatus and method for secure communication between an earth station and spacecraft. A laser outputs single pulses that are split into preceding bright pulses and delayed attenuated pulses, and polarized. A Pockels cell changes the polarization of the polarized delayed attenuated pulses according to a string of random numbers, a first polarization representing a "1," and a second polarization representing a "0." At the receiving station, a beamsplitter randomly directs the preceding bright pulses and the polarized delayed attenuated pulses onto longer and shorter paths, both terminating in a beamsplitter which directs the preceding bright pulses and a first portion of the polarized delayed attenuated pulses to a first detector, and a second portion of the polarized delayed attenuated pulses to a second detector to generate a key for secure communication between the earth station and the spacecraft.

6 Claims, 2 Drawing Sheets

SECURE COMMUNICATIONS WITH LOW-ORBIT SPACECRAFT USING QUANTUM CRYPTOGRAPHY

The present invention generally relates to secure communication systems, and, more specifically, to secure communication between earth and low-orbit spacecraft. This invention was made with Government support under Contract No. W-7405-ENG-36 awarded by the U.S. Department of Energy. The Government has certain rights in the invention.

FIELD OF THE INVENTION

Whenever sensitive information, be it military secrets or the proprietary information of corporations, is transferred from place-to-place, it becomes vulnerable to eavesdropping by unauthorized third parties, with potentially catastrophic consequences. This problem, which has been existent for centuries, has been countered by what has become known as cryptography, the science of secret communication. The primary goal of cryptography is the encryption of a message in a manner that will render the message unintelligible to unauthorized third parties.

This goal of cryptography is accomplished, with provable security, when both the sender and receiver of the message possess a secret random sequence, whether letters, numbers, or bits, which is referred to as the "key material." This key material obviously is a valuable resource, meaning that the initial step in secure communications, the distribution of the key material to the two parties, must be accomplished with a high level of confidence so that a third party cannot acquire even partial information about the random sequence of material.

If the two parties wishing to share secret information, conventionally referred to as "Alice" and "Bob," are communicating solely through conventional messages, it is impossible for them to generate a certifiably secret key. However, certifiably secure distribution is possible if the two parties communicate with single-photon transmissions using the technology known as quantum cryptography. The high level of security achievable with this technology is based on the inviolability of the laws of quantum mechanics. Because of Heisenberg's uncertainty principle, a third party neither can successfully tap the key transmissions, nor can evade detection if he tries. This is due to the fact that any eavesdropping raises the key error rate above a predetermined threshold value. Quantum cryptography avoids the cumbersome physical security aspects of conventional key distribution methods, and provides a secure alternative to key distribution schemes based on public key cryptography, which are becoming vulnerable to advances in factoring algorithms and improved computing techniques.

As earth satellites and other spacecraft become even more prolific, issues relating to the security of earth to satellite communications have become exceedingly important. Particularly, satellite telemetry is becoming more susceptible to eavesdropping even as the importance of satellite intelligence and the security of data and of command paths to spacecraft is continually increasing. Current methods for securing satellite telemetry transmissions against third party interception rely on the perceived difficulty of interception of periodically uploaded random number generation "seeds" for use in cryptologics in the spacecraft and at a secure ground station. However, these methods are open to eavesdropping, and are not demonstrably secure.

A copending application by the inventor herein, U.S. patent application Ser. No. 08/647,479, filed May 14, 1996, discloses an improved detector for practicing quantum cryptography. It also contains a description of the practical aspects of using quantum cryptography in secure communications.

The present invention provides a system for secure telemetry between a low-orbit satellite and a secure ground station utilizing quantum cryptography based on non-orthogonal polarization states of pulsed laser light, attenuated to a level of one photon per pulse. These polarized photons are used to generate shared key material between the satellite and the ground station through optical systems which facilitate long range communication through space.

It is therefore an object of the present invention to provide secure communication between a spacecraft in low-earth orbits and earth.

It is another object of the present invention to utilize quantum cryptography techniques to provide secure communication between a spacecraft in low-earth orbits and earth.

It is yet another object of the present invention to provide secure communication between a spacecraft in low-earth orbit and earth using polarized photons of light to transfer random key material.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, apparatus for generating a key to be used for secure communication between a spacecraft in a low-earth-orbit and an earth station comprises a laser for outputting pulses of light, with means for splitting the pulses of light into preceding bright pulses and delayed attenuated photon pulses. Polarizing and beam-splitting means receive the preceding bright pulses and the delayed attenuated photon pulses for linearly polarizing the preceding bright pulses and the delayed attenuated photon pulses. A Pockels cell receives the polarized preceding bright pulses and the polarized delayed attenuated pulses for switching the linear polarization of the delayed attenuated pulses so that a first polarized delayed attenuated photon pulse represents a "1," and a second polarized delayed attenuated photon pulse represents a "0," the first and second polarized delayed attenuated photon pulses having any polarization states which are different, but not orthogonal to each other. A first telescope is in optical communication with the Pockels cell for transmitting the polarized preceding bright pulses and the first and second polarized delayed attenuated photon pulses into space toward the spacecraft. A second telescope at the spacecraft receives the transmitted polarized preceding bright pulses and the first and second polarized delayed attenuated photon pulses, and a first beamsplitter receives the polarized preceding bright pulses and the polarized delayed attenuated photon pulses for randomly directing the polarized preceding bright pulses and the polarized delayed attenuated pulses onto a longer path, or onto a second shorter path, the shorter path including means for changing the polarization of the polarized delayed attenuated pulses by a quarter wave. A second beamsplitter receives the longer path and the shorter path for directing the polarized preceding bright pulses and a first portion of the polarized delayed attenuated pulses to a first detector, and a second portion of the polarized delayed attenuated pulses to a second detector, the polarized delayed attenuated pulses detected by the second detector being used for determining a key for secure communications between the earth station and the satellite.

In a further aspect of the present invention, and in accordance with its objects and principles, a method for generating a key to be used for secure communication between a spacecraft in a low-earth-orbit and an earth station comprises the steps of generating a random bit sequence at said earth station, and transmitting the random bit sequence to the spacecraft using polarized photon pulses, a first polarized photon pulse representing a "0" and a second polarized photon pulse representing a "1," the first and second polarized photons having any polarization states which are different, but not orthogonal to each other, each of the polarized photon pulses being preceded in time by a bright pulse; detecting the transmitted random bit sequence at the spacecraft to determine locations and values of detected bits, each of the locations being denoted by receipt of a bright pulse; transmitting the locations of the detected bits from the spacecraft to the earth station using conventional communications; comparing the locations of the detected bits with the random bit sequence to determine a sequence of matching bits for use by the spacecraft and the earth station as a key for cryptographic information to be sent between the spacecraft and the earth station.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention allows secure communication between earth stations and satellites in low-earth orbits. It accomplishes this through application of quantum cryptography techniques applied through novel optical arrangements that enable secure long-range communication through space. The invention is most easily understood through reference to the drawings.

Figure 1:
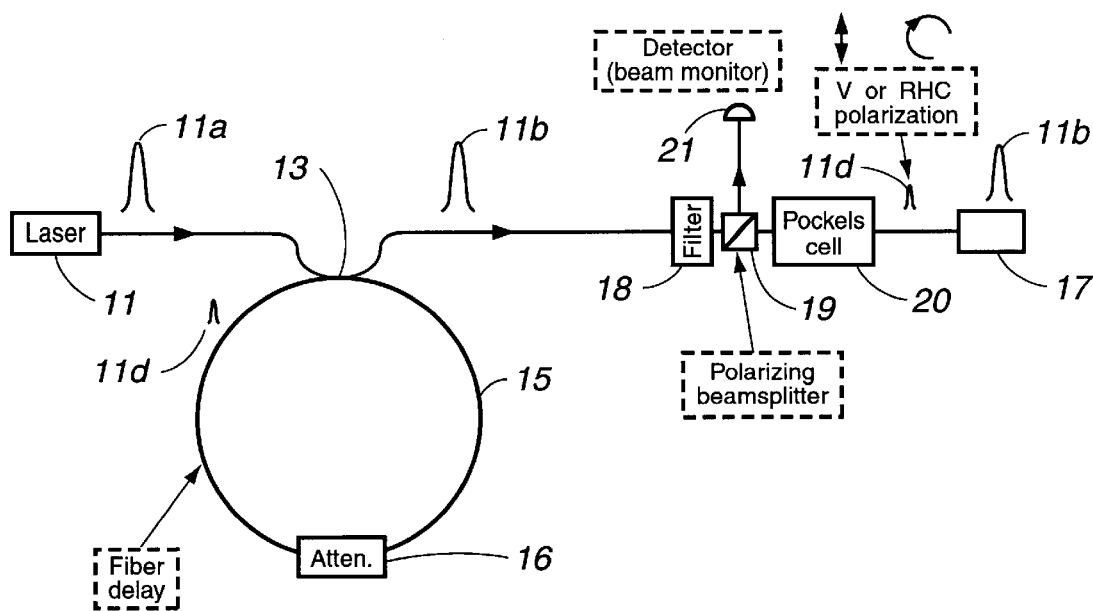
FIG. 1 is schematical drawing of one embodiment of the components of the present invention used to polarize and send light pulses.

In FIG. 1, a schematical drawing illustrates the components of the present invention involved in sending photon pulses to a remote detector. Here, laser 11 outputs single pulses 11a, which have a duration of approximately 100 ps, to optical fiber 12 which is connected to asymmetric beamsplitter 13. Asymmetric beamsplitter 13 directs pulse 11b of single pulses 11a onto optical fiber 14, and pulse 11c into fiber delay 15 and through attenuator 16, emerging as attenuated photon pulse 11d. Fiber delay 15 is effective in delaying attenuated photon pulse 11d in optical fiber delay 15 by approximately 150 ns for timing purposes, and attenuator 16 attenuates photon pulse 11d to single photon level.

The effect of this beam splitting is that each photon pulse 11d is preceded in time by brighter pulse 11b. This brighter pulse 11b, as hereinafter will be described, initiates a period of about 100 ps at the receiving end for receipt of the attenuated and polarized photon pulse 11d.

Pulse 11b, neither has been attenuated nor delayed, and proceeds along optical fiber 14 to filter 18. Filter 18 is a narrow band optical filter to assure that only the photon pulses pass through to polarizing beamsplitter 19. Beamsplitter 19 imparts a definite linear polarization to pulses passing through it.

A portion of each pulse 11b, 11d from laser 11 is directed by beamsplitter 19 to beam monitor detector 21. This pulse is used to stabilize laser 11 so that laser 11 produces a predetermined output frequency of photon pulses of light.

The pulses that pass through beamsplitter 19 are directed to Pockels cell 20. Pockels cell 20 is capable of changing the linear polarization of pulses passing through it. This assures that the correct polarization is imparted to photon pulses 11d before they are transmitted, but is disabled until pulses 11b have passed. For example, Pockels cell 20 could impart vertical (V) polarization to photon pulses 11d intended to represent zeros, and right hand circular (RHC) polarization to photon pulses 11d intended to represent ones. This particular combination of polarization states is used only for ease of explanation. Any other possible polarization combination also can be used, as long as the chosen polarization combination is not orthogonal, one to the other.

After passing through Pockels cell 20, pulses 11b, and photon pulses 11d, now representing zeroes and ones, are launched into space through sending telescope 17.

Figure 2:
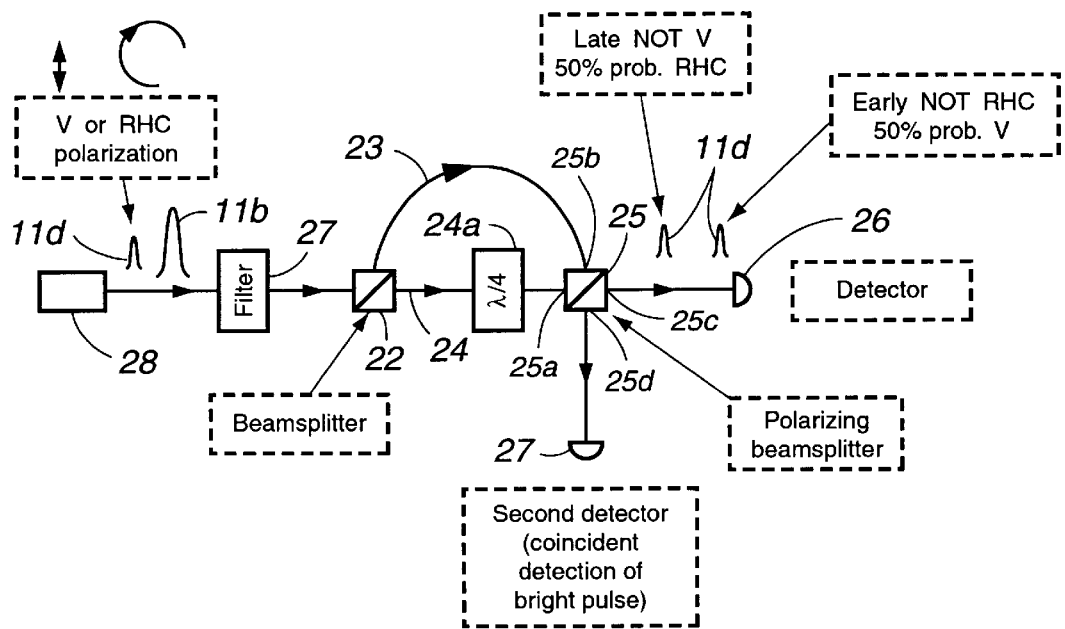
FIG. 2 is a schematical drawing of one embodiment of the components of the present invention used to receive and interpret light pulses.

Reference should now be directed to FIG. 2, where the receiving arrangement is schematically illustrated. As shown, launched pulses 11b and 11d are received through receiving telescope 28, and pass through narrow filter 21. Narrow filter 21 acts to assure that only pulses 11b, 11d pass, and rejects any background present at its input.

Bright pulses 11b encounter beamsplitter 22 where they are split between longer path 23 and shorter path 24. Bright pulses 11b exit polarizing beamsplitter 25 at output 25d, being detected by detector 27. The detection of a bright pulse 11b by detector 27 initiates the above-described timing for receipt of a photon pulse 11d.

After exiting narrow filter 21, photon pulses 11d pass to beamsplitter 22, where each photon pulse 11d is randomly directed either to longer path 23 or to shorter path 24, each terminating at polarizing beamsplitter 25. Shorter path 24 includes quarter-wave transform 24a for shifting the polarization of photon pulses 11d which are directed into shorter path 24, vertical polarization being shifted to left-handed circular (LHC) polarization, and RHC polarization being shifted to horizontal (H) polarization, in the previous example.

Photon pulses 11d which have traversed shorter path 24 and had their polarization shifted by quarter-wave transform 24a are then directed to input 25a of polarizing beamsplitter 25 in which it will be directed to one of outputs 25c, 25d depending on its polarization. For example, if a particular photon pulse 11d now has LHC polarization, it will be directed to output 25c and, with 50% probability, will be detected as a zero by detector 26. This represents the zero sent, zero measured case.

However, if a particular photon pulse 11d has RHC polarization, it will be shifted to H polarization by quarter-wave transform 24a, and directed to input 25a of polarizing beamsplitter 25, and will be output from output 25d to detector 27. This photon pulse 11d is not detected by detector 26, and is therefore not part of the key. This is the one sent, zero measured case.

Photon pulses 11d which have traversed longer path 23 are presented to input 25b of polarizing beamsplitter 25, delayed in time with respect to photon pulses 11d which traversed shorter path 24. At polarizing beamsplitter 25, RHC polarized photon pulses 11d have a 50% probability of exiting at output 25c and being directed to detector 26 (the one sent, one measured case), while V polarized photon pulses 11d exit at output 25d and are not detected and are not part of the key (the zero sent, one measured case).

Figure 3:
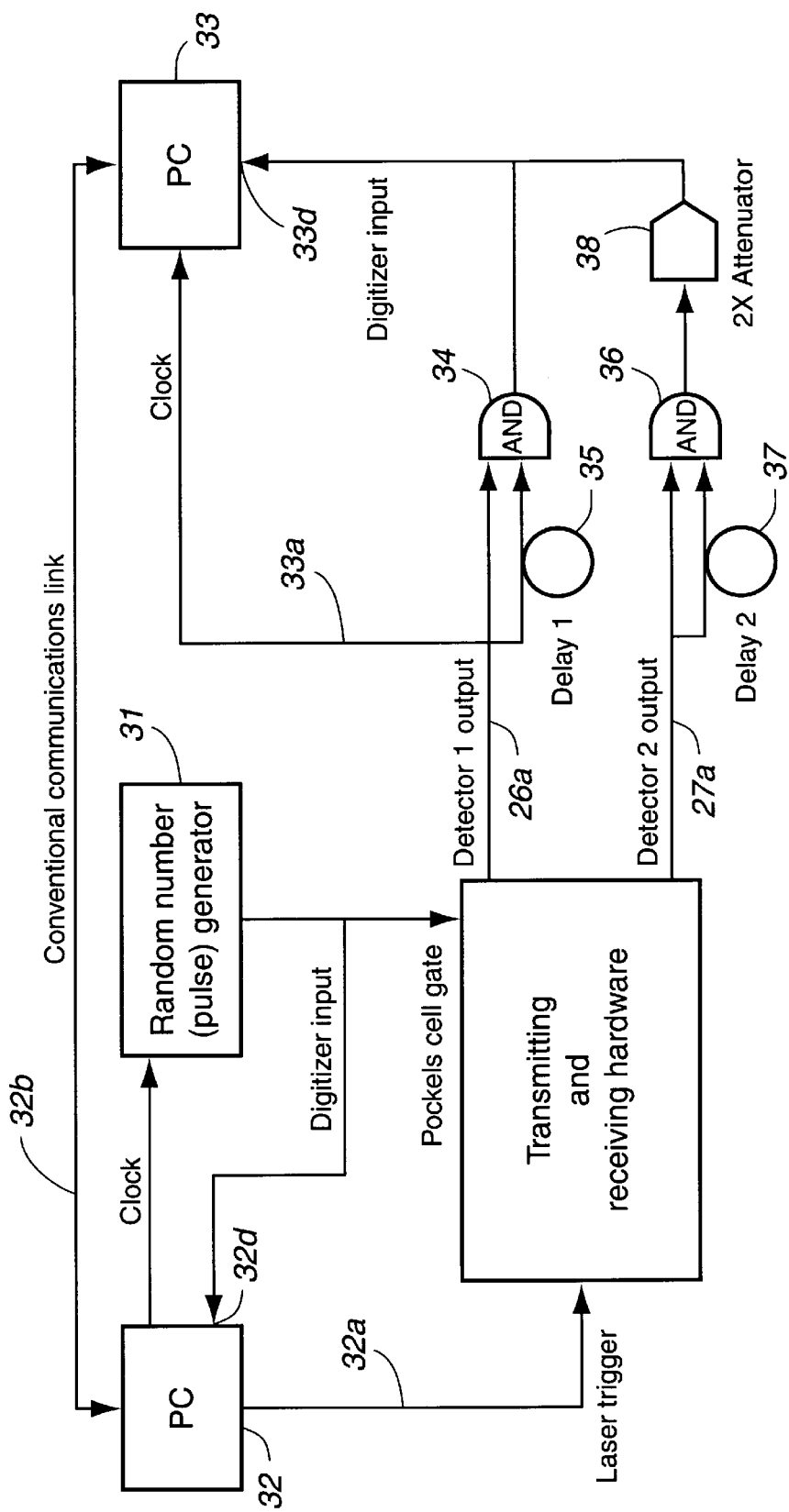
FIG. 3 contains a block diagram describing the functions of the various control components of the present invention.

The components of the present invention which provide the control functions to both the sending arrangement of FIG. 1, and the receiving arrangement of FIG. 2 are illustrated in block form in FIG. 3. Here, it can be seen that random number generator 31 is provided with a clock signal from sending computer 32, and outputs a string of random numbers to pockels cell 20 (FIG. 1) and to digitizer input 32d of sending computer 32. Through this input 32d, sending computer 32 receives and stores the digitized string of random numbers.

As previously discussed pockels cell 20 imparts the correct polarizations to photon pulses 11d so that photon pulses 11d properly represent either the "ones" or "zeroes" of the string of random numbers. Additionally, sending computer 32 provides laser trigger signals 32a to laser 11 so that it properly produces light pulses that will become bright pulses 11b and photon pulses 11d (FIGS. 1 and 2). Sending computer 32 is connected to receiving computer 33, at the earth station, by conventional communications link 32b.

At the receiving end (FIG. 2), output 26a of detector 26 is connected to AND gate 34, along with clock signal 33a from receiving computer 33. Clock signal 33a is delayed by time delay 35 in order to provide the coincident timing between arrival of a bright pulse 11b and the subsequent arrival of a photon pulse 11d. The output of and gate 34 is connected to receiving computer 33 for compilation.

Output 27a of detector 27 (FIG. 2) is connected to AND gate 36 along with a time delayed output 27a from time delay 37. The output of AND gate 36 is passed through 2X attenuator 38 before being connected to digitizer input 33d of receiving computer 33. 2X attenuator 38 is provided to allow voltage discrimination between bright pulses 11b and photon pulses 11d (FIGS. 1 and 2).

Both sending computer 32 and receiving computer 33 have commercially available National Instruments DAQ cards installed for timing and acquisition control through commercially available LABVIEW® software interfaces (not shown). Digitizer inputs 32d and 33d are part of the DAQ cards which provide the necessary digitization of the various signals.

In operation, a string of random numbers is generated at the sending end (FIG. 1) by random number generator 31 (FIG. 3). This string of random numbers is input to Pockels cell 17 (FIG. 1) so that photon pulses 11d following bright pulses 11b are polarized correctly to represent the ones and zeroes of the string of random numbers.

At the receiving end (FIG. 2), each bright pulse 11b arriving at detector 27, as hereinbefore described, initiates a period of approximately 100 ps during which a pulse single photon pulse 11d is expected at detector 26. An "early" arriving single photon pulse 11d, being a single photon pulse 11d which has traversed shorter path 24 (FIG. 2), is definitely not RHC polarized (not a one), but was definitely V polarized (a zero). A "late" arriving single photon pulse 11d, being a single photon pulse 11d which has traversed longer path 23 (FIG. 2), is definitely not V polarized (not a zero), but was definitely RHC polarized (a one).

Detectors 26, 27 can be silicon avalanche photodiodes manufactured by EG&G. Other equally sensitive detectors also could be used.

As each single photon pulse 11d is detected by detector 26, its corresponding value and its location, as denoted by receipt of a bright pulse 11b, is recorded (either a zero or a one) in the order received by receiving computer 33 (FIG. 3). Receiving computer 33 also determines the 100 ps window after receipt of bright pulse 11b at detector 27 (FIG. 2). After completion of the transmission from the sending end, the resulting string of locations as determined by receiving computer 32 (FIG. 3), not bit values, is sent back to sending computer 32, in a clear transmission, if desired, over conventional communications link 32b (FIG. 3). Sending computer 32 then uses the locations sent by receiving computer 33 to identify the bit values from its random number string corresponding to the received locations, and discards the unused bits of the string. The matching bits are then used in the cryptographic transmissions between the sending and receiving end.

Laser 11 (FIG. 1) is preferably a 772 nm temperature stabilized semiconductor diode laser. This wavelength is chosen because the atmosphere provides low attenuation at this wavelength. Additionally, the atmosphere is essentially non-birefringent, and only weakly dispersive at the wavelength of 772 nm, allowing pulses 11b, 11d to maintain their time profiles and polarizations during transmission. However, there will be, of course, some attenuation and beam wander because of atmospheric turbulence. This turbulence will affect the key rate, but not the error rate, because it is only those photon pulses 11d that actually trigger detector 26 (FIG. 2) that are used to generate the key. It is necessary only to generate some shared bits; particular bit values are not important.

Assuming 20 cm optics for sending telescope 17 (FIG. 1), and receiving telescope 28 (FIG. 2), beam wander, due to atmospheric turbulence of approximately 10 times the diffraction limit (i.e. 10 arc seconds of wander), and a 300 km propagation path, the collection efficiency at the receiving end is approximately $10^{-4}$. Thus, with laser 11 (FIG. 1) having a pulse rate of 10 MHz, a one photon-per-pulse 11d average, and an atmospheric transmission efficiency of approximately 80%, single photon pulses 11d will arrive at detector 26 (FIG. 2) at a rate of approximately 1 kHz. With detector 26 having an assumed efficiency of 80%, and allowing for the 25% intrinsic inefficiency of the quantum cryptography protocol, a key generation rate of approximately 100 Hz is feasible. The key generation rate can be increased by using a simple adaptive optics feedback system to control the direction of the transmitted beam, thereby compensating for the effects of atmospheric turbulence.

For secure transmissions between earth stations and airborne structures, the principal source of transmission errors will be from background photons, with dark counts from detector 26 (FIG. 2) yielding a much smaller contribution to error. Assuming that the spacecraft with which secure communication is desired is looking straight down toward the earth at night, and a new moon, the background would be approximately 10 $R\text{Å}^{-1}$, with $1R=10^6$ photons $s^{-1}$ $cm^{-2}$ (4 pi-steradian)$^{-1}$. If the detector apparatus in the spacecraft "sees" a solid angle approximately five times the apparent size of the source at the earth station, or about 50 arc seconds, and with a 1 nm bandwidth filter 21 (FIG. 2), there will be approximately 500 Hz of background photons reaching detector 26 (FIG. 2). With a detector 26 efficiency of approximately 80%, the probability of a background noise count in the 100 ps window during which polarized photon pulse 11d is expected would be approximately $4\times10^{-8}$. However, for each polarized photon 11d transmitted, there will approximately $2\times10^3$ "empty" time windows, making the error rate on a moonless night approximately $8\times10^{-5}$. On a night with a full moon, calculations have indicated a background of approximately 500 RÅ$^{-1}$, which yields an increase of approximately 0.4% in the background error rate.

Thus, in one minute of transmission time, approximately 6,000 key bits could be generated, containing approximately 24 errors in the case of a full moon, and less than one error on a moonless night. Employing conventional communication error correction and "privacy amplification" techniques, it is possible to distill approximately 1000 pure "seed" bits which contain no errors to a high degree of probability, without revealing any key material to an adversary. This procedure can be accomplished easily during the few minutes in which the spacecraft is over the ground station.

Of course, there might be only certain orbits which meet the nighttime requirements of quantum cryptography, but, even using the pessimistic assumptions stated above, "seed" updating at the rate of once every few days is feasible.

The use of laser communications also is increasing between ground to ground, ground to aircraft, aircraft to aircraft, and aircraft to spacecraft. As this technology matures it will be possible to provide the present invention for this type of communications, rendering it secure through the use of quantum cryptography as taught herein.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for generating a key to be used to secure communication between a spacecraft in a low-earth-orbit and an earth station comprising:

a laser for outputting pulses of light;

means for splitting said pulses of light into preceding bright pulses and delayed attenuated photon pulses;

polarizing and beamsplitting means receiving said preceding bright pulses and said delayed attenuated photon pulses for linearly polarizing said preceding bright pulses and said delayed attenuated photon pulses;

means for generating a string of random numbers;

a Pockels cell receiving said polarized preceding bright pulses and said polarized delayed attenuated pulses for switching said linear polarization of said delayed attenuated pulses and said string of random numbers so that a first polarized delayed attenuated photon pulse represents a "1," and a second polarized delayed attenuated photon pulse represents a "0," in accordance with said string of random numbers, said first and second polarized delayed attenuated photon pulses having any polarization states which are different, but not orthogonal to each other;

a first telescope in optical communication with said Pockels cell for transmitting said polarized preceding bright pulses and said first and second polarized delayed attenuated photon pulses into space toward said spacecraft;

a second telescope at said spacecraft for receiving said transmitted polarized preceding bright pulses and said first and second polarized delayed attenuated photon pulses;

a first beamsplitter receiving said polarized preceding bright pulses and said polarized delayed attenuated photon pulses for randomly directing said polarized preceding bright pulses and said polarized delayed attenuated pulses onto a longer path, or onto a second shorter path, said shorter path including means for changing said polarization of said polarized preceding bright pulses and said polarized delayed attenuated pulses by a quarter-wave a second beamsplitter receiving said longer path and said shorter path for directing said polarized preceding bright pulses and a first portion of said polarized delayed attenuated pulses to a first detector and a second portion of said polarized delayed attenuated pulses to a second detector, said polarized delayed attenuated pulses detected by said second detector being used for determining a key for secure communications between said earth station and said satellite.

2. The apparatus as described in claim 1, further comprising a narrow filter means for filtering out background at said earth station and at said satellite.

3. The apparatus described in claim 1 wherein said laser operates at a wavelength of 772 nm.

4. The apparatus as described in claim 1 wherein said first and second detectors comprise silicon avalanche photodiode detectors.

5. The apparatus as described in claim 1 further comprising a third detector connected to said polarizing means for providing pulses for stabilizing said laser output.

6. A method for generating a key to be used to secure communication between a spacecraft in a low-earth-orbit and an earth station comprises the steps of:

generating a random bit sequence at said earth station;

transmitting said random bit sequence to said spacecraft using polarized photon pulses, a first polarized photon pulse representing a "0" and a second polarized photon pulse representing a "1," said first and second polarized photons having any polarization states which are different, but not orthogonal to each other, each of said polarized photon pulses being preceded in time by a bright pulse;

detecting said transmitted random bit sequence at said spacecraft to determine locations and values of detected bits, each of said locations being denoted by receipt of a said bright pulse;

transmitting said locations of said detected bits from said spacecraft to said earth station using conventional communications;

comparing said locations of said detected bits with said random bit sequence to determine a sequence of matching bits for use by said spacecraft and said earth station as a key for cryptographic information to be sent between said spacecraft and said earth station.

* * * * *